July 15, 1958     H. A. GREENWALD ET AL     2,843,325
THERMOSTATIC CONTROLS
Filed June 1, 1954

HAROLD A. GREENWALD,
WILLIAM D. WHITAKER,
INVENTORS.

BY John H. J. Wallace

United States Patent Office 2,843,325
Patented July 15, 1958

2,843,325

THERMOSTATIC CONTROLS

Harold A. Greenwald, Los Angeles, and William D. Whitaker, Manhattan Beach, Calif., assignors to The Garrett Corporation, Los Angeles, Calif., a corporation of California Application June 1, 1954, Serial No. 433,546

9 Claims. (Cl. 236—102)

This invention relates generally to thermostatic controls and more particularly to a thermostatic control valve suitable for use at comparatively high temperatures, such as occur at the nozzle box of a gas turbine.

Thermostatic control valves have found much utility in the control of gas turbines. Valves of this type may also be used to control the firing of ceramic kilns or similar devices operating at high temperatures. In one common usage, a valve is provided at the nozzle box of a gas turbine so that when the temperature reaches a predetermined point, the valve will decrease the supply of fuel to the combustion chamber of the turbine, thereby preventing the turbine from becoming overheated. Another usage is found as a thermostatic control valve in the exhaust port of such a turbine.

Due to repeated exposure of these valves in such usage to temperatures of the order of 1500° to 1700° F., devices of the prior art fail quite frequently. These devices generally include metallic springs of one type or another which soon lose their temper upon repeatedly being exposed to heating and cooling. This often causes the valve to lose calibration, which may result in severe damage to both the turbine and the valve.

One object of this invention is to provide a thermostatic control valve which is of simplified construction, adapted for use at high temperatures, and which is operated by the action of a fluid under pressure and which therefore does not require springs.

Another object of the invention is to provide a high temperature thermostatic control valve wherein the thermal expansion differential between two materials is utilized to actuate a valve in one direction and wherein fluid means under pressure is employed to urge the valve in the opposite direction.

A further object of this invention is to provide a thermostatic control valve which may be accurately preset to operate at a predetermined temperature and wherein undesired or inadvertent readjustments cannot occur.

Yet another object of this invention is to provide a thermostatic control valve for high temperature operation which is actuated in one direction by the relative movement between two members due to the differential in thermal expansion therebetween, which is actuated in the opposite direction by remotely controlled fluid pressure, and which may be employed to actuate a fuel by-pass valve or other device when a desired temperature is reached.

Yet another object is to provide a thermostatic control valve having a plurality of expansion rods forming a core loosely retained within a temperature sensing tube, said core and tube being adapted to actuate a valve when they are exposed to a predetermined temperature and being so arranged as to be properly operable even when warped by repeated heating and cooling cycles.

Still another object of the invention is to provide a compact device of the class described, readily changeable from a normally open thermostatically controlled valve which will close upon being heated, to a normally closed thermostatic valve which will open upon being heated.

Other objects and advantages of the present invention will become apparent by referring to the embodiments thereof described and illustrated in the following specification and drawing, in which.

Figure 1:
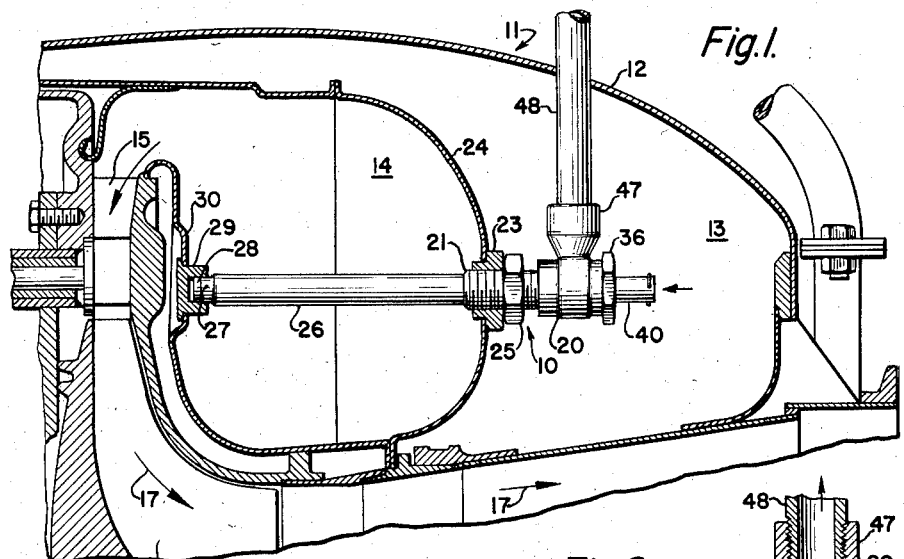
Fig. 1 is a fragmentary sectional view of a gas turbine having installed in the entry scroll thereof a normally closed control valve according to the invention.

Referring to Fig. 1 of the drawing, a thermostatic valve 10 is shown installed at the hot end of a gas turbine 11. The turbine 11 includes an outer casing 12 defining a plenum chamber 13 through which hot gas from a combustion chamber, not shown, passes into an entry scroll 14. From the scroll 14 the hot gas flows past the stationary nozzles 15, through the turbine wheel 16 and is then exhausted, as indicated by arrows 17.

The thermostatic valve 10 of the invention includes a housing 20 having an extension 21 adapted to be secured by threads 22 (see also Fig. 2) through a boss 23 provided in a wall 24 of the scroll 14. Lock nut 25 engaging the threads 22 may be used to adjustably secure the valve 10 in position through the wall 24, preferably in proximity to the turbine nozzles 15. A temperature sensing tube 26 is secured within the free end of the extension 21 by a press fit or welding and extends across the scroll 14, that is, across the path of the hot gas. Confined within the tube 26 are a plurality of thermally expansible rods or bars 31 forming together a core 31a of a suitable metallic alloy or of a ceramic material. The temperature sensing tube 26 in this form of the invention, has a lower coefficient of expansion than the thermally expansible core 31a. The core 31a will therefore expand more than the tube 26 when exposed to the same degree of heat.

The end portion 27 of the tube 26 is of reduced diameter, is preferably sealed by a cap 28 and may be held by a boss 29 in an opposed wall 30 of the scroll. It will be noted that suitable clearance is provided in the boss 29 to allow for expansion of the tube 26 when it is subjected to the heat generated in the scroll 14. The ends of bars 31 are of semi-spherical shape as indicated at 32. An end 32 of the right hand bar 31 abuts a plunger 33 (see also Fig. 3) slidable within the extension 21 of the housing. A finger-like rod 34, integral with the plunger 33, extends through an inlet port 35 in a valve casing 36 which is secured by threads 37 to the housing 20. A ball seat 38 is formed on one side of the inlet port 35 and a ball 39 is adapted to coact therewith to provide the valve. A cylindrical extension 40 of the valve casing 36 is provided with a bore 41 having a light weight, lapped and hollow piston 42 slidable therein.

Figure 2:
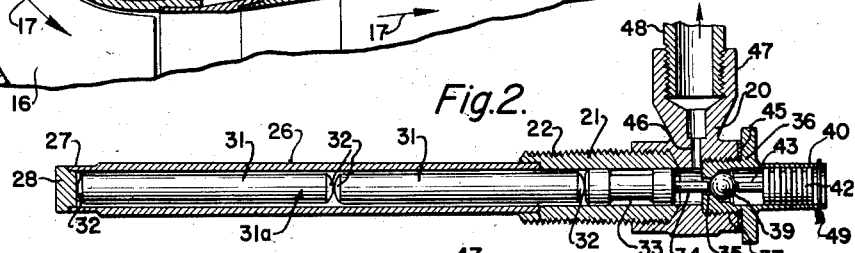
Fig. 2 is an enlarged sectional view of the control valve of Fig. 1 in a closed position.
Figure 4:
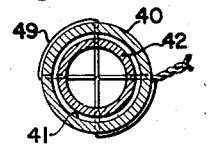
Fig. 4 is a detailed sectional view taken on line 4—4 of Fig. 3.

Upon starting the turbine, fluid pressure is increased in the plenum chamber. This fluid pressure acts on the piston 42 to urge the ball 39 against its seat 38 by means of a rod 43 on the piston, thereby closing the valve as shown in Fig. 2. A bleed port 44 extending through the face of the piston 42 allows the fluid pressure from the plenum chamber to slowly leak to the left hand side of the piston. A shim spacer 45 disposed between the valve casing 36 and the housing 20 permits extremely accurate calibration of the valve in order that it may open when a desired temperature is reached in the scroll 14; the manner in which this is accomplished will be explained in detail later.

An exhaust port 46 communicates through a threaded boss 47 and a conduit 48 threaded into the boss, to any well known fuel control means, for example, a fuel valve, not shown. A wire 49 extending crosswise of bore 41, serves to prevent accidental removal of the piston 42.

The operation of the thermostatic valve of this form of the invention is as follows. Assuming the turbine scroll 14 to be at ambient temperature, upon starting the turbine, fluid pressure is initially increased in the plenum chamber 13. This increase in fluid pressure will urge piston 42 and the finger 43 toward the left to force the ball 39 against its coacting seat 38, thereby closing the valve as shown in Fig. 2. High pressure fluid from the plenum chamber 13 will leak through the bleed port 44 until the pressure acting against the ball 39 is equal to that in the plenum chamber. This pressure will then retain the ball 39 in the closed position even after the piston 42 is no longer urged toward the left because the pressure on both sides thereof has been equalized.

Figure 3:
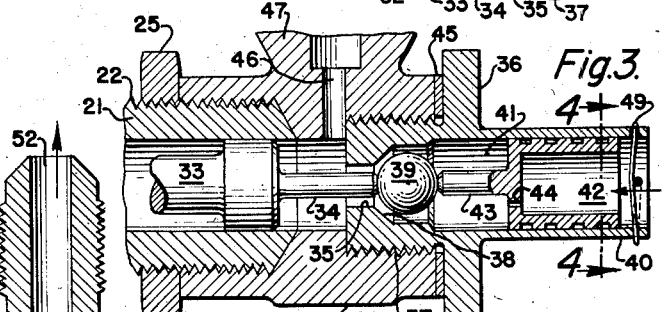
Fig. 3 is a fragmentary detailed sectional view on a further enlarged scale showing the control valve of Fig. 1 in its open position.

As combustion of the fuel continues in the combustion chamber and heated gas passes into the scroll 14, the tube 26 and expansible bars 31 forming the core 31a will expand. Due to the differential in the coefficients of expansion between the tube 26 and core 31a, the core 31a, when exposed to a predetermined temperature will force the plunger 33 and the finger-like rod 34 toward the right to unseat the ball 39 and hence to open the valve as illustrated in Fig. 3. It should be noted that since the pressure on both sides of the piston 42 is now equalized, the valve will fully open upon first breaking the seal between the ball 39 and the seat 38. Fluid under pressure from the plenum chamber 13 will therefore pass through the inlet port 35, outlet port 46 and through the conduit 48, to actuate a fuel bypass valve or similar device, not shown.

Figure 5:
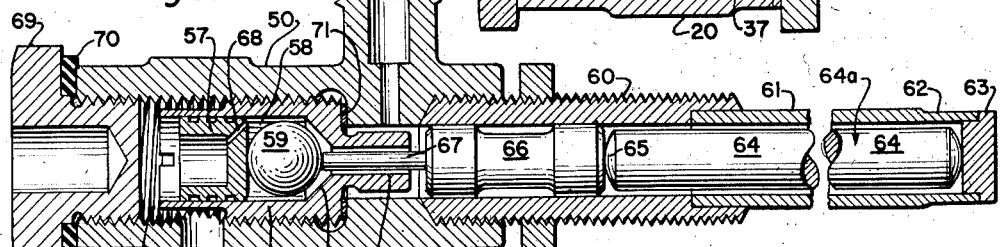
Fig. 5 is a sectional view similar to Fig. 2 showing a modified form of the invention.

A modified form of the invention illustrated in Fig. 5 has a normally open valve. A suitable housing 50 is provided with an inlet port 51 and an outlet port 52. Inlet port 51 communicates directly with a threaded hole 53 in the housing 50 wherein is disposed a valve casing 54 provided with a valve seat 55 and an outlet opening 56. A lapped, hollow piston 57 is adapted to slide in an aperture 58 in the valve casing 54 having provided therein a ball 59. An extension 60 is threaded into one end of the housing 50 and a temperature sensing tube 61 preferably extends into the hot gas scroll of a turbine of conventional design. The end of the tube 61 has a reduced diameter portion 62 and is provided with a cap 63. Expansible bars 64 forming a core 64a and having semi-spherical ends 65 abutting each other, are retained within the temperature sensing tube 61. One of the spherical ends 65 of a bar 64 abuts a plunger 66 having integral therewith a finger-like rod 67. The rod 67 extends through the inlet port 56 to contact the ball 59.

A bleed orifice 68 through the end wall of the piston 57 allows fluid to pass slowly through the valve opening into the outlet port 52. A cap 69 and a washer 70 serve to seal the housing against outside pressure and as in the previous embodiment of the invention, a setting shim 71 is provided in the aperture 53, between the housing 50 and the valve casing 54, to accurately set the device for a desired temperature at which the valve is to close.

A lock nut 72 similar to the lock nut 25 of the valve of Fig. 1 may be provided on the threaded extension 60.

Assuming a normally open valve as shown in Fig. 5, the operation of the device is as follows. A supply of fluid such as air or a combination of air and fuel is applied to inlet port 51. This fluid then passes into the threaded hole 53 and through the bleed orifice 68 in the piston 57. Fluid pressure on the piston 57 will urge the ball 59 against the finger 67, tending to close the valve. The fluid then passes around ball 59, through the outlet opening 56 and the outlet port 52 to a suitable bypass valve or similar device not shown.

As the tube 61 and bars 64 expand by different amounts due to the temperature changes in the nozzle box, it will be apparent that a relative movement will occur changing the position of the ball 59. The fluid pressure against the piston 57 will tend to urge the ball 59 against the finger 67 of the valve seat 55. Should there be overheating of the tube 61 and core 64a, the valve will gradually close, thereby reducing the flow of fluid through the exhaust port 52. In this case, of course, the temperature sensing tube 61 should be made of a material having a greater coefficient of expansion than that of the bars 64, therefore closing the valve when a predetermined temperature is reached.

It will be apparent that the coefficients of expansion of the expansible cores and of the tube control whether the valve will be normally open or normally closed. For example, if the coefficient of expansion of the tube is greater than that of the core, then a normally open valve is provided tending to gradually close with an increase in temperature. Should a normally closed valve be desired, tending to open with a temperature increase, the core will be made of a material having a greater coefficient of expansion than that of the tubes.

Any increase in the thickness of the shim spacer 45 of Fig. 2 will cause the valve to be opened at a higher temperature. This is due to the increased amount of expansion required of the tube 26 and core 31a to contact the ball 39 of the valve. In the normally open valve of Fig. 5 an increase in the thickness of the shim spacer 71 will cause the valve to close at a lower temperature.

It will be obvious that the invention provides an efficient and versatile thermostatic control valve particularly adapted for operation at high temperatures. The valve may be accurately set to open or close at a variety of temperatures and retain its calibration under severe conditions of use.

What is claimed is:

1. A thermostatic control mechanism for a turbine nozzle box comprising: a temperature sensing expansible tube closed at one end, a housing provided at the opposite end of said tube, expansible core means disposed within said tube and having a greater coefficient of expansion than that of said tube, whereby one end of said core means will move toward said housing in response to application of heat to said tube and said core means, a valve within said housing adapted for actuation to a fully open position by elongation of said core means, a piston disposed adjacent to said valve and responsive to fluid pressure to yieldably urge said valve into the closed position; and means for equalizing fluid pressure at opposite ends of said piston when said valve is in a closed position.

2. In a thermostatic control device suitable for use in a turbine having a hot gas scroll and a plenum chamber surrounding the same, the combination of: a temperature sensing tube extending within said hot gas scroll; a housing provided at one end of said tube, said housing being disposed in said plenum chamber adjacent said hot gas scroll; a core comprising a plurality of elements adapted to be retained within said tube and having a coefficient of expansion different from that of said tube; a movable ball disposed within said housing; a seat for said ball formed in said housing, said ball and seat constituting a valve adapted for actuation in one direction by the relative movement between said tube and core in response to temperature variations in said hot gas scroll; a piston disposed for movement in said housing to actuate said valve, said piston being responsive to fluid pressure; and passage means establishing limited communication between the regions at opposite ends of said piston to equalize pressures in such regions and apply closing pressure to said ball when the same is engaged with said seat.

3. In a thermostatic device suitable for use in a turbine having a hot gas scroll and a plenum chamber surrounding the same, the combination of: a temperature sensing tube closed at one end and adapted to extend within said hot gas scroll; a housing provided at the opposite end of said tube, said housing being disposed in said plenum chamber adjacent said hot gas scroll; a plurality of thermally expansible members abutting each other, retained within said tube and having a greater coefficient of expansion than that of said tube; a valve within said housing adapted for actuation to an open position by the relative movement between said tube and said core in response to increased temperature in said hot gas scroll; a piston disposed in said housing, said piston being responsive to fluid pressure in said plenum to move said valve in a direction opposed to that resulting from relative movement between said tube and core; fluid inlet means communicating with said valve in said housing, fluid outlet means communicating with said valve in said housing, whereby fluid may pass through said valve in quantities which increase proportionately with the temperature increase of said tube and said members and whereby fluid pressure tends to close said valve.

4. In a thermostatic control device suitable for use in a turbine having a hot gas scroll and an adjacent plenum chamber, the combination of: a temperature sensing tube closed at one end and adapted to extend within said hot gas scroll; a housing disposed in said plenum chamber adjacent said hot gas scroll, an extension connecting said housing to the opposite end of said temperature sensing hollow tube; a core of thermally expansible material retained within said tube, said core having a greater coefficient of expansion than that of said tube; a valve formed within said housing and including a seat and a ball adapted for actuation to an open position by the relative movement between said tube and said core due to the expansion thereof in response to an increase in temperature within said hot gas scroll; fluid pressure responsive means, having a bleed port to one side of said valve, in said housing and adapted to urge said ball against said seat, thereby tending to close said valve; an exhaust port communicating with said valve to release fluid pressure from said plenum chamber when said valve is opened; spacer means between a portion of said valve and said housing for predetermining the desired temperature for closing said valve; and means actuated by said core to control said valve in response to the application of heat to said tube and core in opposition to said fluid pressure responsive means.

5. In a thermostatic valve suitable for use with a turbine having a hot gas scroll and a plenum chamber, the combination of: a temperature sensing tube closed at one end and positioned within said hot gas scroll; a housing provided with a threaded portion secured to the other end of said tube and located in said plenum chamber; said scroll being adapted to support the opposite ends of said temperature sensing hollow tube; a core comprising thermally expansible bars abutting each other and retained within said tube, said bars having a different coefficient of expansion than that of said tube; a valve including a ball and a seat therefor within said housing, said valve being adapted for actuation in one direction by the relative movement between said tube and said core in response to a temperature increase in said hot gas scroll; shim means secured between a portion of said valve and said housing for adjusting the distance between said valve and said housing; and inlet and outlet means in said housing communicating with said valve for conducting fluid through said valve in quantities varying proportionately with the variation in dimensions between said tube and core in response to predetermined temperature changes in said turbine hot gas scroll.

6. In a thermostatic valve suitable for use with a turbine having a hot gas scroll and an adjacent plenum chamber, the combination of: a temperature sensing tube closed at one end and having a bearing surface slidably supported within said turbine hot gas scroll; a housing disposed in said plenum chamber adjacent said hot gas scroll and provided with an extension connecting said housing to the opposite end of the temperature sensing tube; a core comprising a plurality of thermally expansible bars abutting each other and provided with semi-spherical ends, said bars having a greater coefficient of expansion than that of said tube and retained therein; a ball and a seat therefor forming a valve within said housing, said valve being adapted for actuation to an open position by the relative longitudinal movement between said tube and said core due to increased temperatures in said hot gas scroll; fluid pressure means tending to actuate said valve to a closed position; shim means secured between the seat of said valve and said housing for adjusting the position of said seat in said housing; and inlet and outlet means communicating with the interior of said housing for conducting fluid through said valve in quantities which increase proportionately with the temperature increase of said tube and core.

7. In a thermostatic valve suitable for use with a turbine having a hot gas scroll and a plenum chamber, the combination of: a temperature sensing tube having a bearing surface at one end mounted within said turbine hot gas scroll; a housing provided with a threaded extension adjustably supported in the wall of said hot gas scroll, said extension being secured to the opposite end of said temperature sensing hollow tube; a core comprising a plurality of thermally expansible bars provided with semi-spherical ends abutting each other, said bars having a different coefficient of expansion than that of said tube and being retained therein; a ball and seat forming a valve within said housing, said valve being adapted for actuation in one direction by the relative movement between said tube and said core in response to a temperature increase in said hot gas scroll; fluid pressure responsive means including a piston tending to actuate said valve in the opposite direction; shim means secured between said valve seat and said housing for adjusting the distance between said ball and said seat; and means in said housing for conducting fluid through said valve in quantities variable according to the temperature of said tube and core.

8. A thermostatic control device comprising: an expansible temperature sensing tube, a housing provided at one end of said tube, a thermally actuated core confined in said tube and having a different coefficient of expansion than that of said tube, a valve within said housing adapted for actuation in one direction by said core in response to the application of heat to said tube and core, fluid pressure responsive means including a piston adapted to apply pressure to said valve and tending to actuate said valve against the action of said tube and core, and passage means establishing limited communication between the regions at opposite ends of said piston to render the latter ineffective when said valve is closed.

9. A thermostatic control device comprising: an expansible temperature sensing tube, a housing provided at one end of said tube, a core confined in said tube and having a different coefficient of expansion than that of said tube, a valve within said housing adapted for actuation in one direction by said core in response to the application of heat to said tube and core, fluid pressure responsive means including a piston having an effective pressure responsive area different from that of said valve, said piston serving to apply a force to said valve tending to move the same toward a closed position; and passage means establishing limited communication between the regions at the opposite ends of said piston to vary the force tending to move said valve toward a closed position after such position is reached.

References Cited in the file of this patent

UNITED STATES PATENTS

| | | |
|---|---|---|
| 1,530,917 | Snediker | Mar. 24, 1925 |
| 1,651,972 | Smalley | Dec. 6, 1927 |
| 1,912,921 | Spencer | June 6, 1933 |
| 2,107,673 | Lovekin | Feb. 8, 1938 |
| 2,280,128 | Price | Apr. 21, 1942 |
| 2,363,595 | Joesting | Nov. 28, 1944 |
| 2,371,428 | De Giers | Mar. 13, 1945 |
| 2,393,841 | Titcomb | Jan. 29, 1946 |
| 2,411,295 | Saballus et al. | Nov. 19, 1946 |
| 2,667,743 | Lee | Feb. 2, 1954 |